(12) United States Patent
Dilts et al.

(10) Patent No.: US 8,992,294 B2
(45) Date of Patent: Mar. 31, 2015

(54) WINDROW DOOR ASSEMBLY FOR AN AGRICULTURAL COMBINE

(75) Inventors: Mark David Dilts, New Holland, PA (US); Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 236 days.

(21) Appl. No.: 13/600,712

(22) Filed: Aug. 31, 2012

(65) Prior Publication Data
US 2014/0066146 A1 Mar. 6, 2014

(51) Int. Cl.
*A01F 12/30* (2006.01)
*A01D 41/12* (2006.01)

(52) U.S. Cl.
CPC .................................. *A01D 41/1243* (2013.01)
USPC .......................................................... 460/111

(58) Field of Classification Search
USPC .......... 460/111, 112, 114, 119, 901; 56/320.2
See application file for complete search history.

(56) References Cited

U.S. PATENT DOCUMENTS

| | | | |
|---|---|---|---|
| 4,056,107 A | 11/1977 | Todd et al. | |
| 4,263,772 A | 4/1981 | Phillips et al. | |
| 4,489,734 A | 12/1984 | Van Overschelde | |
| 5,556,042 A | 9/1996 | Roberg | |
| 6,598,812 B1 | 7/2003 | Matousek et al. | |
| 6,685,558 B2 | 2/2004 | Niermann et al. | |
| 6,719,627 B2 | 4/2004 | Wolters et al. | |
| 6,783,454 B2 | 8/2004 | Bueermann | |
| 6,863,605 B2 | 3/2005 | Gryspeerdt et al. | |
| 6,994,623 B2* | 2/2006 | Isfort et al. ..................... | 460/114 |
| 7,186,179 B1 | 3/2007 | Anderson et al. | |
| 7,220,179 B2 | 5/2007 | Redekop et al. | |
| 7,473,169 B2 | 1/2009 | Isaac | |
| 7,487,024 B2 | 2/2009 | Farley et al. | |
| 7,559,833 B2 | 7/2009 | Isaac et al. | |
| 7,635,299 B2 | 12/2009 | Murray et al. | |
| 7,648,413 B2 | 1/2010 | Duquesne et al. | |
| 7,717,779 B1 | 5/2010 | Weichholdt et al. | |
| 7,927,200 B2 | 4/2011 | Van Overschelde et al. | |
| 8,010,262 B2 | 8/2011 | Schroeder et al. | |
| 8,070,570 B2 | 12/2011 | Murray et al. | |
| 2003/0109294 A1* | 6/2003 | Wolters et al. ................ | 460/112 |
| 2003/0114207 A1* | 6/2003 | Wolters et al. ................ | 460/111 |
| 2004/0029624 A1* | 2/2004 | Weichholdt ..................... | 460/112 |
| 2004/0053653 A1* | 3/2004 | Isfort et al. ..................... | 460/119 |
| 2004/0112031 A1* | 6/2004 | Dickey .......................... | 56/320.2 |
| 2005/0282602 A1* | 12/2005 | Redekop et al. ............... | 460/112 |
| 2007/0037620 A1* | 2/2007 | Anderson et al. ............. | 460/111 |
| 2009/0156277 A1 | 6/2009 | Benes et al. | |

* cited by examiner

FOREIGN PATENT DOCUMENTS

EP 1461993 B1 2/2004
EP 2008505 B1 6/2008

*Primary Examiner* — Thomas B Will
*Assistant Examiner* — Mai Nguyen
(74) *Attorney, Agent, or Firm* — Patrick M. Sheldrake; Seyed V. Sharifi T.

(57) ABSTRACT

A windrow door assembly for controlling a direction of flow of crop residue expelled from a combine is disclosed. The window door assembly may generally include a door panel extending between a first end and a second end. The door panel may be moveable between a closed position, wherein the crop residue being expelled from the combine is directed along the door panel into a spreader of the combine, and an opened position, wherein the crop residue is directed along the door panel towards a rear opening of the combine. In addition, the windrow door assembly may include a deflector panel rotatably coupled to the door panel. The deflector panel may be configured to alter the direction of flow of the crop residue when the door panel is in the opened position.

18 Claims, 4 Drawing Sheets

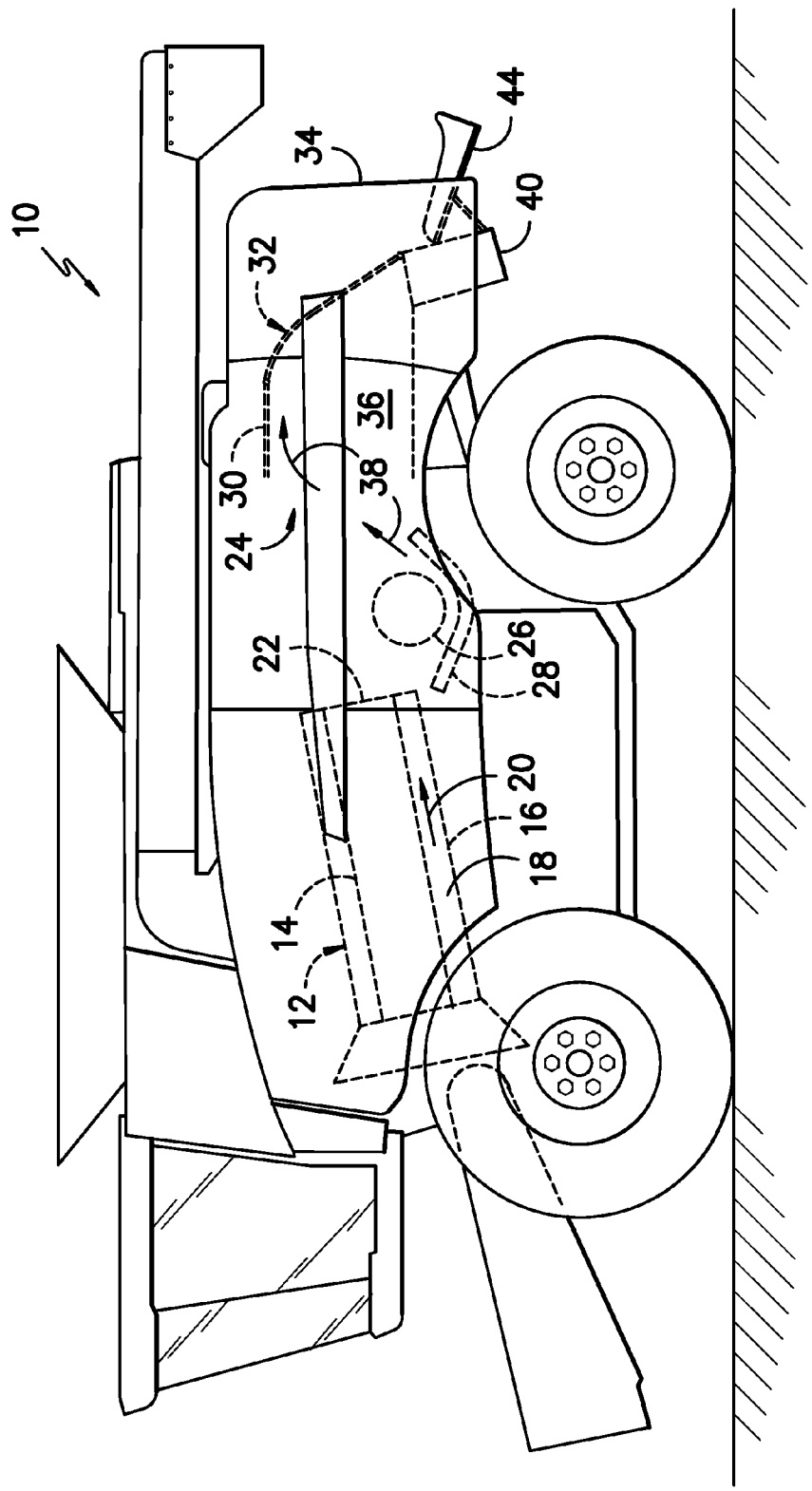
FIG. -1-

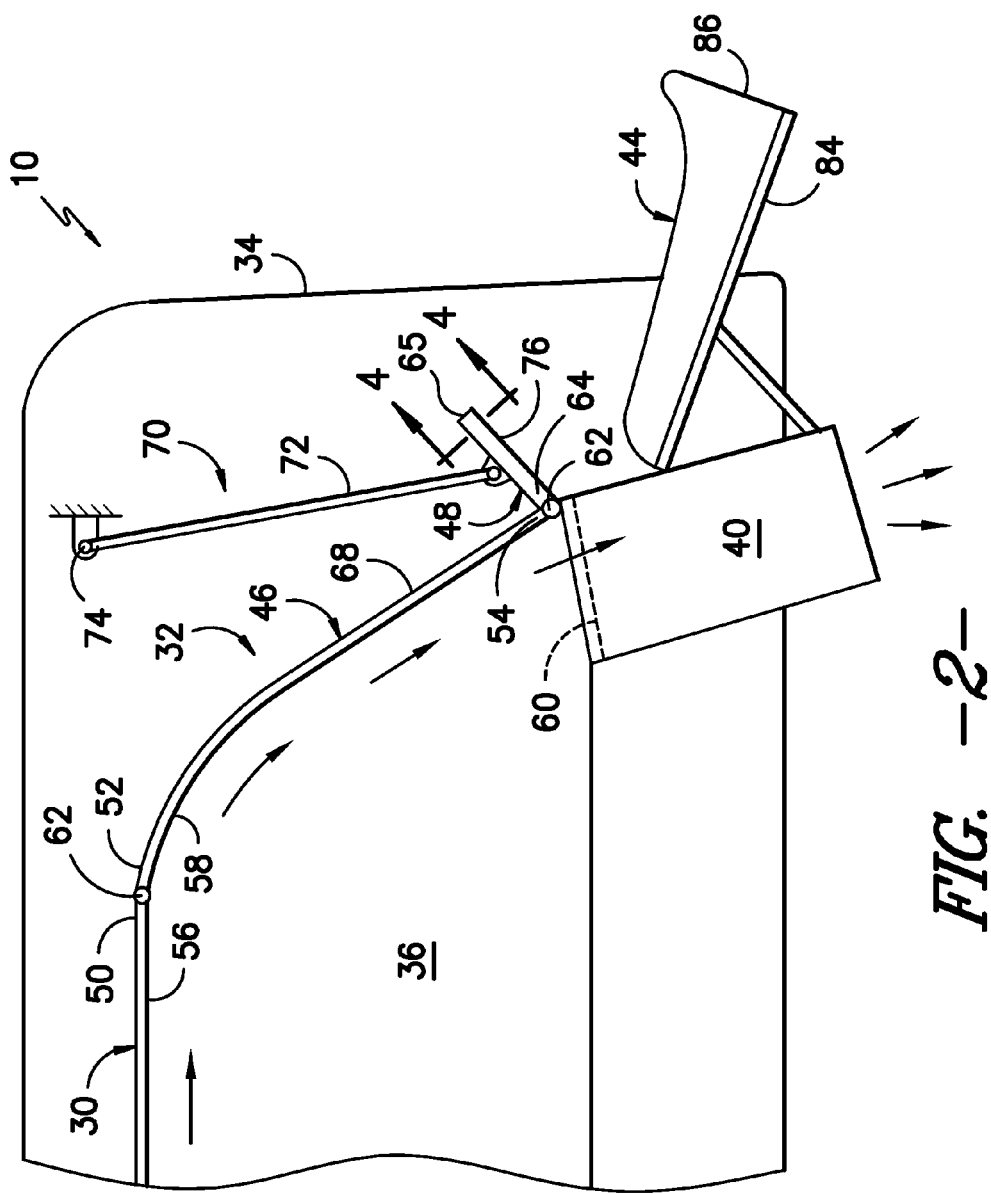
FIG. -2-

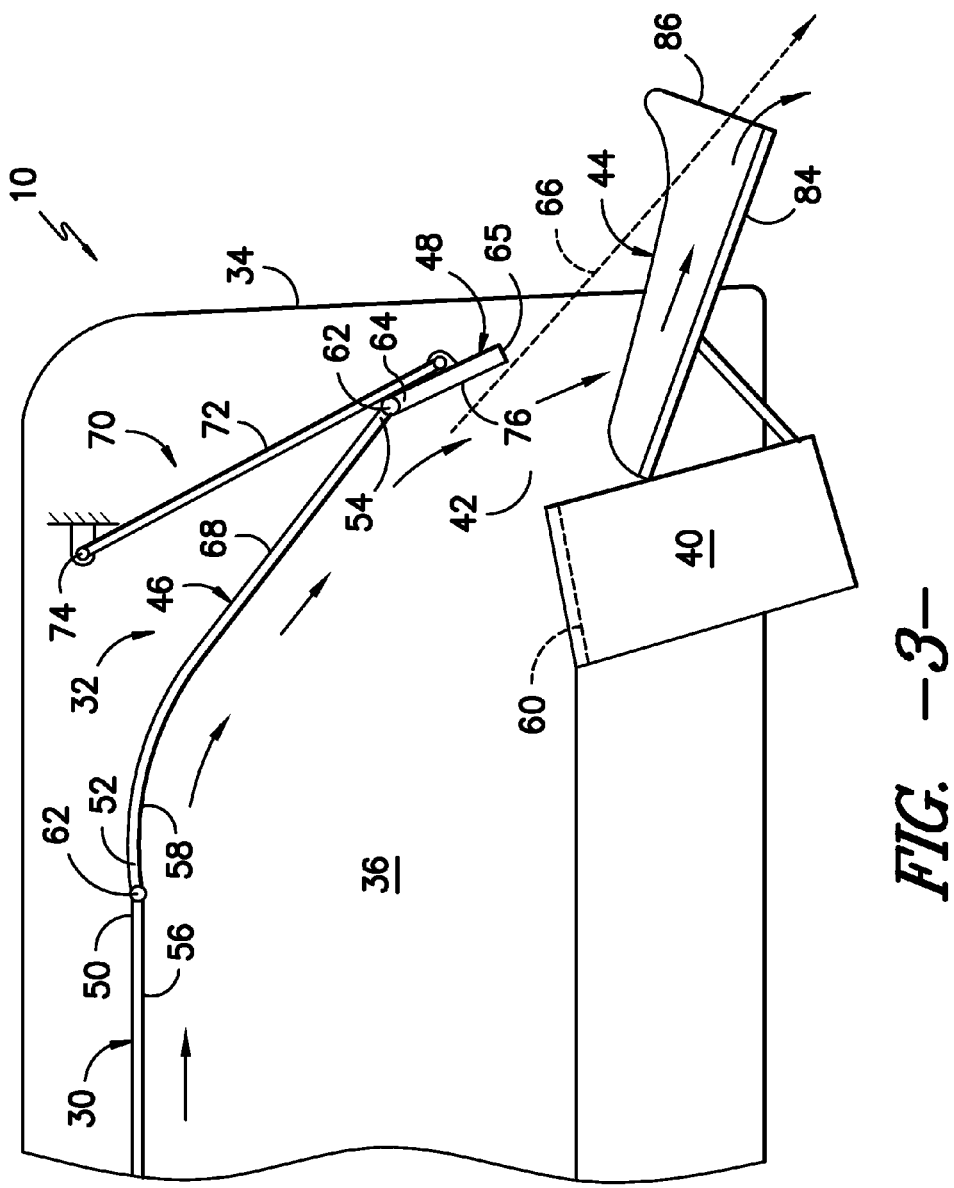
FIG. -3-

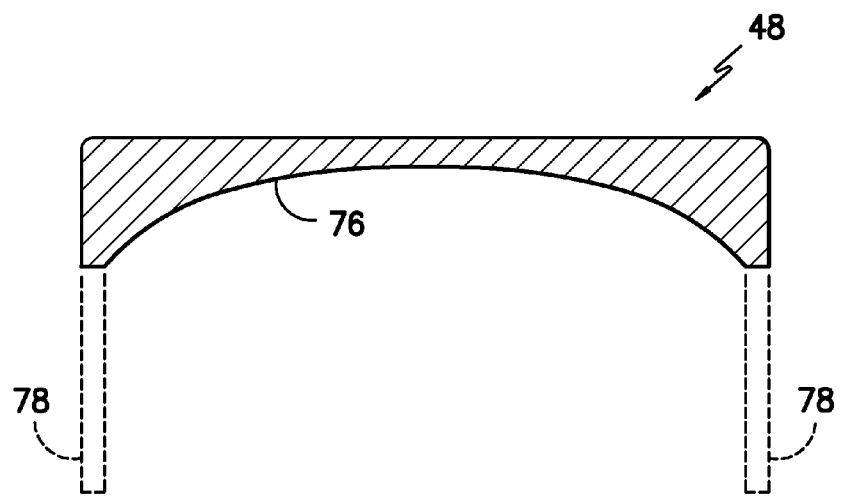
FIG. -4-
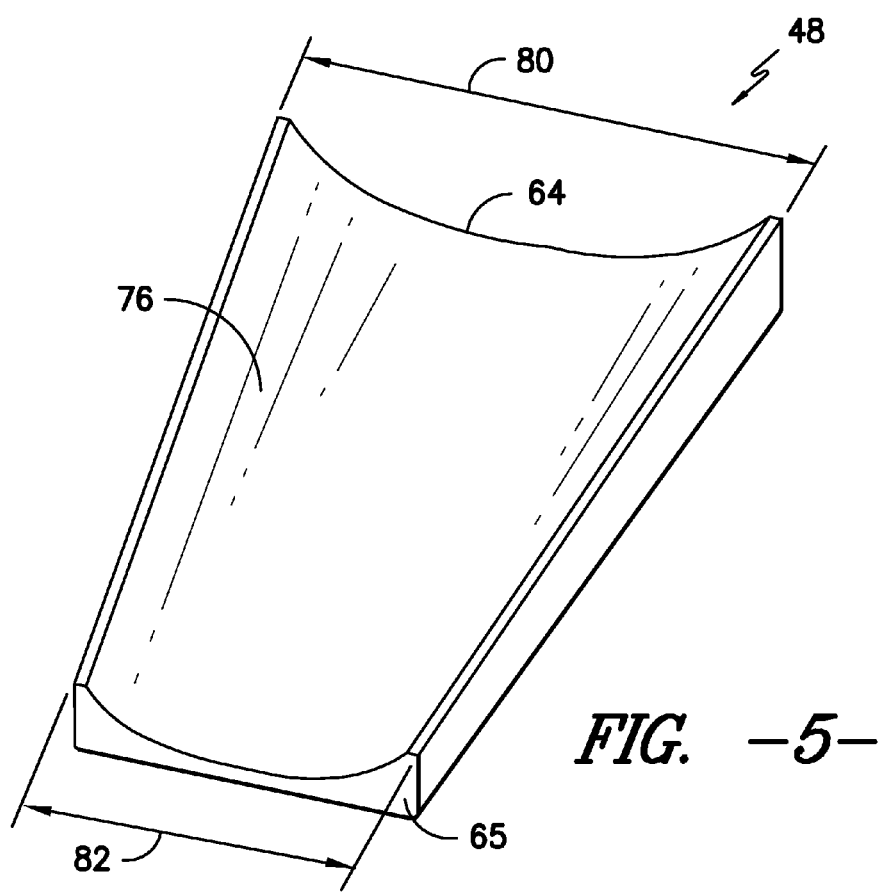
FIG. -5-

WINDROW DOOR ASSEMBLY FOR AN AGRICULTURAL COMBINE

FIELD OF THE INVENTION

The present subject matter relates generally to agricultural combines and, more particularly, to a windrow door assembly having a deflector panel configured to deflect a flow of crop residue onto a windrow chute of the combine.

BACKGROUND OF THE INVENTION

Axially arranged rotary threshing or separating systems have long been in use in agricultural combines for threshing crops to separate grain from crop residue, also referred to as material other than grain (MOG). Such axially arranged systems typically include at least one cylindrical rotor rotated within a cage or concave, with the rotor and surrounding concave being oriented so as to extend forwardly to rearwardly within the combine.

During operation of the combine, crop material is fed or directed into a circumferential passage between the rotor and the concave and is carried rearwardly along a generally helical path through such passage by rotation of the rotor as grain is threshed from the crop material. The flow of crop residue remaining between the rotor and concave after threshing is typically discharged or expelled at a rear or downstream end of the rotor. After discharge from the threshing system, the crop residue is typically directed into a crop residue distribution system located below and rearwardly of the rear end of the rotor. The crop residue distribution system typically includes a rotary beater or chopper or other apparatus that conveys and/or chops and propels the residue rearwardly towards an area within the rear end of the combine, hereinafter referred to as a distribution chamber. The crop residue provided within the distribution chamber may either be discharged therefrom onto a field as a windrow or be directed into a chopper and/or spreader mounted on or at the rear end of the combine that is operable for spreading the residue over a swath of a field.

Windrowing typically occurs when, under certain conditions and in certain localities, users desire to retain the crop residue for post-processing. In such cases, the residue, which may be chopped or un-chopped, is discharged from the combine, without entering the chopper/spreader, to form a windrow directly behind the combine. Such windrow may, for example, contain only straw residue or both straw residue and chaff, and may typically be produced by the expulsion of the residue flow over the top of the chopper/spreader, such as when the crop residue is discharged through a rear opening of the distribution chamber. As is generally understood, a windrow door is typically positioned at the rear opening and is pivotable between a closed position, wherein the crop residue is diverted into the chopper/spreader, and an open position, wherein the crop residue is directed over the chopper/spreader and through the rear opening.

When the crop residue is to be discharged onto a field to form a windrow, it is typically preferred that the crop residue be distributed onto a windrow chute extending from the rear opening to allow for the formation of a desirable windrow shape. This generally requires that the rear opening be rather large. Unfortunately, when the windrow door is moved to the open position and, thus, forms a large opening at the rear end of the combine, the crop residue may often fail to contact the window chute (e.g., by flowing directly over the windrow chute and onto the field). This leads to the crop residue being discharged onto the field at a very high velocity, which may result in the formation of an undesirable windrow.

Accordingly, a windrow door assembly that is capable of accurately directing the flow of crop residue onto a windrow chute for subsequent discharge onto a field would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a windrow door assembly for controlling a direction of flow of crop residue expelled from a combine. The window door assembly may generally include a door panel extending lengthwise between a first end and a second end. The door panel may be moveable between a closed position, wherein the crop residue being expelled from the combine is directed along the door panel into a spreader or chopper of the combine, and an opened position, wherein the crop residue is directed along the door panel towards a rear opening of the combine. In addition, the windrow door assembly may include a deflector panel rotatably coupled to the door panel. The deflector panel may be configured to alter the direction of flow of the crop residue when the door panel is in the opened position.

In another aspect, the present subject matter is directed to an agricultural combine. The combine may generally include a threshing system configured to separate a flow of crop material into crops and a crop residue. The combine may also include a crop residue distribution system configured to expel the crop residue from the combine. The crop residue distribution system may include a guide panel and a windrow door assembly configured to define a flow surface for the crop residue. The windrow door assembly may include a door panel extending lengthwise between a first end and a second end. The first end may be rotatably coupled to the guide panel such that the door panel is moveable between a closed position, wherein the crop residue being expelled from the combine is directed along the door panel into a spreader or chopper of the combine, and an opened position, wherein the crop residue is directed along the door panel towards a rear opening of the combine. In addition, the windrow door assembly may include a deflector panel rotatably coupled to the door panel. The deflector panel may be configured to alter the direction of flow of the crop residue when the door panel is in the opened position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a simplified, side view of one embodiment of an agricultural combine;

FIG. 2 illustrates an interior, side view of one embodiment of a windrow door assembly configured for use with the combine shown in FIG. 1, particularly illustrating a door panel of the windrow door assembly in a closed position;

FIG. 3 illustrates another an interior, side view of the windrow door assembly shown in FIG. 2, particularly illustrating the door panel in an opened position;

FIG. 4 illustrates a cross-sectional view of a deflector panel of the windrow door assembly shown in FIGS. 2 and 3 taken about line 4-4 (FIG. 2); and FIG. 5 illustrates a perspective view of the deflector panel shown in FIG. 4, particularly illustrating the deflector panel with its inner surface facing upward.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a windrow door assembly for controlling the direction of flow of crop residue being expelled from an agricultural combine. Specifically, in several embodiments, the windrow door assembly may include a door panel movable between a closed position, at which the crop residue is directed along the door panel towards a spreader or chopper of the combine, and an opened position, at which the crop residue is directed along the door panel towards a rear opening of the combine. In addition, the assembly may include a deflector panel configured to alter the flow of the crop residue when the door panel is in the opened position. For example, in several embodiments, the deflector panel may be rotatably or hingedly coupled to an end of the door panel such that the deflector panel may be rotated into the flow path of the crop residue, thereby permitting the panel to deflect the crop residue onto a window chute of the combine. Thus, when the crop residue is to be discharged onto a field as a windrow (i.e., when the door panel is in the opened position), the residue may be directed along the door panel and deflected by the deflector panel onto the windrow chute.

It should be appreciated by those of ordinary skill in the art that, by properly depositing crop residue onto a windrow cute, the residue may formed into a desirable windrow. For example, the windrow chute may reduce the velocity of the crop residue such that it is gently dropped onto the field. As a result, the crop residue may be deposited onto the field in a substantially continuous, cohesive, air permeable mat, which is laid more on the stubble on the field in contrast to being driven into and integrated into the stubble. This can lead to shorter drying times and can facilitate quicker, more efficient baling of the crop residue.

Referring now to the drawings, FIG. 1 illustrates a simplified, side view of one embodiment of an agricultural combine 10. In general, the combine 10 may be configured the same as or similar to any suitable agricultural combine known in the art. For instance, as shown in FIG. 1, the combine 10 may include an axially arranged threshing system 12. As is generally understood, the threshing system 12 may include a cylindrical rotor 14 rotatably supported within a cage or concave 16 for conveying a flow of crop material in a helical flow path along a circumferential space 18 defined between the rotor 14 and the concave 16. As the crop material is moved through the space 18 towards a rear end 34 of the combine 10 (indicated by arrow 20), the crop (e.g., grain, legumes, and/or the like) may be separated from the residue (e.g., husks, pods and/or the like) and subsequently removed from the threshing system 12. The crop residue may continue along the helical path and may be subsequently discharged through a discharge opening (not shown) defined at a downstream end 22 of the threshing system 12.

In addition, the combine 10 may include a crop residue distribution system 24 for expelling the crop residue from the combine 10. As shown, the distribution system 24 may include a rotary device 26, such as a beater or a chopper, rotatably supported above a concave pan 28. As is generally understood, the rotary device 26 may be configured to be rotated at a rapid speed such that the flow of crop residue exiting the threshing system 12 is propelled rearward along a series of internal shields or panels, such as a guide panel 30 (e.g., a strawhood) and a windrow door assembly 32, towards the rear end 34 of the combine 10. For instance, as shown in FIG. 1, the concave pan 28 may be angled in a manner such that the crop residue is propelled rearwardly and upwardly from the rotary device 26 into a distribution chamber 36 wherein the residue is directed along the guide panel 30 towards the windrow door assembly 32 (indicated by arrow 38). As will be described in greater detail below, depending on whether the windrow door assembly 32 is in a closed or opened position, the crop residue may be directed through the distribution chamber 36 and into a crop residue chopper and/or spreader 40 for swath spreading or through a rear opening 42 (FIG. 3) of the combine 10 for windrowing. The term "spreader" will be used hereinafter (including in the claims) to refer to any device that is capable of spreading crop residue, including known crop residue choppers and/or spreaders.

It should be appreciated that the spreader 40 may generally be configured the same as or similar to any suitable spreader and/or chopper known in the art. For instance, in one embodiment, the spreader 40 may be configured as a vertical spreader and may include two vertically oriented spreader disks configured to distribute the crop residue sideways and rearwardly along a field.

Additionally, as shown in FIG. 1, the distribution system 36 may also include a windrow chute 44 at the rear end 34 of the combine 10 for distributing the crop residue expelled through the rear opening 42. For instance, as will be described below, a portion of the windrow door assembly 32 may be configured to deflect the flow of crop residue onto the windrow chute 44. The crop residue may then be decelerated as it travels along the windrow chute 44 before being dispensed onto a field as a windrow.

Referring now to FIGS. 2 and 3, interior, side views of a portion of the rear end 34 of the combine 10 shown in FIG. 1 are illustrated in accordance with aspects of the present subject matter, particularly illustrating one embodiment of a windrow door assembly 32 suitable for use with the combine 10. As shown, the windrow door assembly 32 may generally include a door panel 46 and a deflector panel 48. In general, the door panel 46 may comprise any suitable elongated member that is configured to serve as a guide for the crop residue as it flows past a downstream end 50 of the guide panel 30. For instance, as shown in the illustrated embodiment, the door panel 46 may generally extend lengthwise between a top or first end 52 and a bottom or second end 54, with the first end 42 being coupled to the downstream end 50 of the guide panel 30. As such, an inner surface 56 of the guide panel 30 and an inner surface 58 the door panel 46 may generally define a continuous flow path for the crop residue flowing within the distribution chamber 36 towards the rear end 34 of the combine 10.

In several embodiments, the first end 52 of the door panel 46 may be rotatably or hingedly coupled to the downstream end 50 of the guide panel 30. As such, the door panel 46 may be rotated relative to the guide panel 30 in order to alter the direction of flow of the crop residue within the distribution chamber 36. For instance, as shown in FIG. 2, the door panel 46 may be configured to be rotated to a closed position at which the second end 54 of the door panel 46 is disposed generally adjacent to an inlet 60 of the spreader 40. Thus, as the crop residue flows past the guide panel 30, it may be directed along the inner surface 58 of the door panel 46 and into the spreader 40 for subsequent swath spreading. Alternatively, as shown in FIG. 3, the door panel 46 may be configured to be moved to an opened position at which the second end 56 of the door panel 46 is rotated away from the spreader 40, thereby defining a rear opening 42 at the rear end 34 of the combine 10 through which the crop residue may be expelled. As such, when the door panel 46 is in the opened position, the crop residue may be directed along the inner surface 58 of the door panel 46 towards the rear opening 42.

It should be appreciated that the door panel 46 may generally define any suitable shape and/or profile that permits the panel 46 to function as described herein. For instance, as shown in FIGS. 2 and 3, the door panel 46 may define a curved profile between its first and second ends 52, 54 in order to allow for a smooth transition of the flow of crop residue between a generally horizontal direction to an angled, downward direction. Additionally, in one embodiment, the door panel 46 may also include side panels (not shown) configured to control the width of the flow of crop residue along the inner surface 58 of the door panel 46. For instance, the side panels may be configured to converge between the first and second ends 52, 54 of the door panel 46 such that the width of the flow of crop residue is narrowed as it is directed along the door panel 46.

Referring still to FIGS. 2 and 3, the deflector panel 48 of the windrow door assembly 32 may generally be configured to alter the direction of flow of the crop residue as it travels along the door assembly 32. For instance, in several embodiments, an upstream end 64 of the deflector panel 48 may be rotatably or hingedly coupled to the second end 54 of the door panel 46 to allow the deflector panel 48 to be rotated into and out of the flow of crop residue depending on whether the door panel 46 is in the opened or closed position. Specifically, as shown in FIG. 3, when the door panel 46 is in the opened position, the deflector panel 48 may be moved into a deflection position at which the panel 48 is angled into the flow of crop residue. As such, the crop residue flowing past the second end 54 of the door panel 46 may contact against or otherwise be deflected by the deflector panel 48, thereby altering the trajectory of the residue as it is expelled from the combine 10 through the rear opening 42. For example, as shown in FIG. 3, without the deflector panel 48 installed onto the door panel 46, the direction of flow of the crop residue traveling past the second end 54 of the door panel 46 (indicated by dashed line 66) may be such that at least a portion of the crop residue fails to contact the windrow chute 44. However, by installing the deflector panel 48 onto the door panel 46 as described herein, the deflector panel 48 may be oriented relative to the flow of crop residue such that the residue is deflected downward onto the windrow chute 44, thereby allowing the residue to be formed into a desirable windrow shape as it is expelled from the chute 44 onto a field.

It should be appreciated that the windrow chute 44 may generally be configured the same as or similar to any suitable windrow chute known in the art. For example, in several embodiments, the windrow chute 44 may include a base panel 84 defining a flow surface for the crop residue expelled through the rear opening 42 and side panels 86 extending upward from the base panel 86. In such an embodiment, the side panels 86 may be configured to converge as the windrow chute 44 extends away from the spreader 40, thereby allowing the width of the flow of the crop residue to be reduced before it is discharged onto a field as a windrow.

Additionally, when the door panel 46 is in the closed position, the deflector panel 48 may configured to be rotated away from the flow of crop residue into a stored position, thereby allowing the residue to be directed along the inner surface 58 of the door panel 46 and into the spreader 40. For example, as shown in FIG. 2, a downstream end 65 of the deflector panel 48 may be rotated upward in the direction of an outer surface 68 of the door panel 46. As such, when the door panel 46 is rotated into the closed position, the second end 54 of the door panel 46 may be positioned adjacent to the inlet 60 of the spreader 40 without the deflector panel 48 contacting the spreader 40 or the flow of crop residue.

It should be appreciated that the hinged connection between the door panel 46 and the deflector panel 48, as well as the hinged connection between the door panel 46 and the guide panel 30, may generally be achieved using any suitable hinged or rotational attachment means known in the art. For instance, as shown in the illustrated embodiment, a hinge pin or pivot tube 62 may be coupled between each of the panels 30, 46, 48. However, in other embodiments, the panels 30, 46, 48 may be hingedly coupled to one another using any other suitable hinged and/or rotatable attachment mechanism.

It should also be appreciated that, in alternative embodiments, the deflector panel 48 need not be coupled to the second end of the door panel 46 as shown in FIGS. 2 and 3, but, rather, may generally be coupled to the door panel at any suitable location between its first and second ends 52, 54. For example, in one embodiment, the pivot point defined between the deflector panel 48 and the door panel 46 may be offset from the second end 54 of the door panel 46.

Additionally, it should be appreciated that, in several embodiments, the position of the deflector panel 48 may be configured to be manually adjusted. For instance, in one embodiment, the deflector panel 48 may be positioned relative to the door panel 48 by means of a spring-loaded pin and/or any other suitable manually adjustable positioning mechanism. In such an embodiment, an operator of the combine 10 may manually adjust the location of the spring-loaded pin and/or other positioning mechanism in order to move the deflector panel 48 between the deflection and stored positions as the door panel 40 is moved between the opened and closed positions, respectively.

Alternatively, the windrow door assembly 32 may include a displacement device 70 configured to automatically adjust the position of the deflector panel 48 relative to the door panel 46. In several embodiments, the displacement device 70 may comprise any suitable mechanical arrangement known in the art that may be utilized to rotate the deflector panel 48 into the proper position as the door panel 46 is moved between the opened and closed positions. For example, as shown in FIGS. 2 and 3, in one embodiment, a mechanical linkage (e.g., rod 72) may be coupled between the deflector panel 48 and a fixed pivot point 74 mounted at the rear end 34 of the combine 10, thereby creating a four-bar linkage arrangement. In such an embodiment, the location of the fixed pivot point 74 and the length of the rod 72 may be selected so that the deflector panel 48 is both rotated downward into the deflection position as the door panel 46 is rotated upward into the opened position and rotated upward into the stored position as the door panel 46 is rotated downward into the closed position.

In other embodiments, the displacement device 70 may comprise an electronically controllable actuating device. For instance, in one embodiment, an electric motor may be coupled to the deflector panel 48 at the hinge axis defined between the upstream end 64 of the deflector panel 48 and the second end 54 of the door panel 46. In such an embodiment, the electric motor may be coupled to a suitable controller to allow the operator to automatically adjust the position of the deflection panel 48 from within the operator's cab. In further embodiments, any other suitable actuating device, such as a hydraulic or pneumatic cylinder, may be used to automatically control the position of the deflector panel 48 relative to the door panel 46.

Additionally, it should be appreciated that the deflector panel 48 may generally define any suitable shape or profile and/or may have any suitable configuration that permits the panel 48 to function as described herein. For example, FIG. 4 illustrates a cross-sectional view of the deflector panel 48 shown in FIGS. 2 and 3 taken about line 4-4 (FIG. 2). As shown, an inner surface 76 of the deflector panel 48 (i.e., the surface that contacts the crop residue) may be bowed or curved across the width of the panel 48. As such, the crop residue may be channeled towards the center of the deflector panel 48 as it flows along the inner surface 76. Similarly, in addition to configuring the deflector panel 48 to include a curved, inner surface 76 or as an alternative thereto, the deflector panel 48 may include side panels (shown by the dashed lines 78) extending outwardly from the inner surface 76 along the sides of the panel 46. Such side panels 78 may generally be configured to control the width of the crop residue as it flows along the inner surface 76 of the deflector panel 48.

Moreover, in one embodiment, the width of the deflector panel 48 may be configured to converge as the panel 48 extends between its upstream and downstream ends 64, 65. For example, FIG. 5 illustrates a perspective view of the deflector panel 48 shown in FIGS. 2 and 3 with the inner surface 76 of the panel 48 facing upwards. As shown, the deflector panel 48 may be configured to converge along its length such that a width 80 of the panel 48 at the upstream end 64 is greater than a width 82 of the panel 48 at the downstream end 65. As such, the width of the flow of crop residue may also converge as the residue is directed along the inner surface 76 of the deflector panel 48.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A windrow door assembly for controlling a direction of flow of crop residue expelled from a combine, the window door assembly comprising:
   a door panel extending lengthwise between a first end and a second end, the door panel moveable between a closed position, wherein the crop residue being expelled from the combine is directed along the door panel into a spreader of the combine, and an opened position, wherein the crop residue is directed along the door panel towards a rear opening of the combine; and
   a deflector panel rotatably coupled to the door panel, the deflector panel being configured to alter the direction of flow of the crop residue; and
   wherein the deflector panel is movable between a deflection position, wherein the deflector panel extends into the flow of the prop residue, and a stored position, wherein the deflector panel is positioned out of the flow of the crop residue.

2. The windrow door assembly of claim 1, wherein the deflector panel is configured to be moved to the deflection position when the door panel is in the opened position.

3. The windrow door assembly of claim 1, wherein the deflector panel is configured to be moved to the stored position when the door panel is in the closed position.

4. The windrow door assembly of claim 3, wherein the door panel includes an inner surface along which the crop residue is directed and an outer surface opposite the inner surface, the deflector panel being rotated to a position adjacent to the outer surface of the door panel when in the stored position.

5. The windrow door assembly of claim 1, further comprising a displacement device configured to move the deflection panel between the deflection position and the stored position.

6. The windrow door assembly of claim 5, wherein the displacement mechanism comprises a rod coupled between the deflector panel and a fixed pivot point, the rod being configured such that, as the door panel is moved into the open position, the deflector panel is rotated into the deflection position.

7. The windrow door assembly of claim 1, wherein an inner surface of the deflector panel is curved along a width of the deflector panel.

8. The windrow door assembly of claim 1, wherein the deflector panel extends between an upstream end coupled to the second end of the door panel and a downstream end opposite the upstream end, the deflector panel defining a converging width between the upstream and downstream ends.

9. The windrow door assembly of claim 1, wherein the first end of the door panel is rotatably coupled to a guide panel of the combine.

10. An agricultural combine, comprising:
   a threshing system configured to separate a flow of crop material into crops and crop residue;
   a crop residue distribution system configured to expel the crop residue from the combine, the crop residue distribution system comprising a guide panel and a windrow door assembly defining a flow surface for the crop residue, the windrow door assembly comprising:
      a door panel extending lengthwise between a first end and a second end, the first end being rotatably coupled to the guide panel such that the door panel is moveable between a closed position, wherein the crop residue being expelled from the combine is directed along the door panel and into a spreader of the combine, and an opened position, wherein the crop residue is directed along the door panel towards a rear opening of the combine; and
      a deflector panel rotatably coupled to the door panel, the deflector panel being configured to alter a direction of flow of the crop residue.; and
      wherein the deflector panel is movable between a deflection position, wherein the deflector panel extends into the flow of the crop residue, and a stored position, wherein the deflector panel is positioned out of the flow of the crop residue.

11. The combine of claim 10, wherein the deflector panel is configured to be moved to the deflection position when the door panel is in the opened position.

12. The combine of claim 10, wherein the deflector panel is configured to be moved to the stored position when the door panel is in the closed position.

13. The combine of claim 12, wherein the door panel includes an inner surface along which the crop residue is directed and an outer surface opposite the inner surface, the deflector panel being rotated to a position adjacent to the outer surface when in the stored position.

14. The combine of claim 10, further comprising a displacement device configured to move the deflection panel between the deflection position and the stored position.

15. The combine of claim 14, wherein the displacement device comprises a rod coupled between the deflector panel and a fixed pivot point, the rod being configured such that, as the door panel is moved into the open position, the deflector panel is rotated into the deflection position.

16. The combine of claim 10, further comprising a windrow chute extending outwardly from the rear opening, the deflector panel being configured to deflect the flow of the crop residue onto the windrow chute.

17. The combine of claim 10, wherein an inner surface of the deflector panel is curved along a width of the deflector panel.

18. The combine of claim 10, wherein the deflector panel extends between an upstream end coupled to the second end of the door panel and a downstream end opposite the upstream end, the deflector panel defining a converging width between the upstream and downstream ends.

* * * * *